(12) United States Patent
Dhayapule et al.

(10) Patent No.: US 10,649,834 B2
(45) Date of Patent: *May 12, 2020

(54) DISTRIBUTED PRODUCT DEPLOYMENT VALIDATION

(71) Applicant: International Business Machines Corporation, Armonk, NY (US)

(72) Inventors: Raghavendra Rao Dhayapule, Bangalore (IN); Natesh H. Mariyappa, Bangalore (IN); Srinivas R. Mangi, Bangalore (IN); Patrick A. Dass, Bangalore (IN)

( * ) Notice: Subject to any disclaimer, the term of this patent is extended or adjusted under 35 U.S.C. 154(b) by 156 days.

This patent is subject to a terminal disclaimer.

(21) Appl. No.: 15/820,291

(22) Filed: Nov. 21, 2017

(65) Prior Publication Data

US 2019/0155674 A1    May 23, 2019

(51) Int. Cl.
   *G06F 11/07* (2006.01)

(52) U.S. Cl.
   CPC ........ *G06F 11/079* (2013.01); *G06F 11/0709* (2013.01); *G06F 11/0751* (2013.01); *G06F 11/0793* (2013.01)

(58) Field of Classification Search
   CPC .............................. G06F 11/07; G06F 11/079
   USPC .......................................................... 714/37
   See application file for complete search history.

(56) References Cited

U.S. PATENT DOCUMENTS

| | | |
|---|---|---|
| 8,140,905 B2 | 3/2012 | Beaty et al. |
| 9,092,287 B2 | 7/2015 | Dubey et al. |
| 9,317,407 B2 | 4/2016 | Sabin et al. |
| 9,971,595 B1 * | 5/2018 | Thompson .......... G06F 16/2365 |
| 10,289,538 B1 * | 5/2019 | Dwivedi ............. G06F 11/3612 |
| 2008/0037532 A1 * | 2/2008 | Sykes ................... H04L 41/147 370/389 |

(Continued)

OTHER PUBLICATIONS

Jansen, S. et al., "Definition and Validation of the Key process of Release, Delivery and Deployment for Product Software Vendors: turning the ugly duckling into a swan", 22nd IEEE International Conference on Software Maintenance, Philadelphia PA, Sep. 2006.

(Continued)

*Primary Examiner* — Kamini B Patel
(74) *Attorney, Agent, or Firm* — North Shore Patents, P.C.; Michele Liu Baillie

(57) ABSTRACT

In deploying a system in a computing environment, before deployment, a deployment engine performs a pre-deployment validation of the system using pre-determined system requirements. When the pre-deployment validation of the system fails, the deployment of the system is terminated. When the pre-deployment validation of the system succeeds, the deployment engine performs the following for each artifact of the system. Before deployment of a given artifact of the system, a pre-deployment validation of the given artifact is performed using pre-determined artifact properties. When the pre-deployment validation of the given artifact fails, the deployment of the system is terminated. When the pre-deployment validation of the given artifact succeeds, the given artifact is deployed. After the deployment of the given artifact, a post-deployment validation of the given artifact is performed using deployment data for the given artifact.

16 Claims, 9 Drawing Sheets

(56) References Cited

U.S. PATENT DOCUMENTS

| | | | |
|---|---|---|---|
| 2009/0181665 A1* | 7/2009 | Sater | H04L 41/5009 455/424 |
| 2011/0296386 A1* | 12/2011 | Woollen | G06F 8/70 717/124 |
| 2012/0311111 A1* | 12/2012 | Frew | G06F 9/5072 709/221 |
| 2013/0151975 A1* | 6/2013 | Shadi | G06F 8/60 715/734 |
| 2013/0275376 A1 | 10/2013 | Hudlow et al. | |
| 2014/0101717 A1* | 4/2014 | Hajost | G06F 8/71 726/1 |
| 2015/0046389 A1* | 2/2015 | Dhayapule | G06F 11/079 707/602 |
| 2015/0052402 A1 | 2/2015 | Gurumurthy et al. | |
| 2015/0324182 A1* | 11/2015 | Barros | G06F 8/61 717/174 |
| 2017/0060968 A1* | 3/2017 | Dhayapule | G06F 11/368 |
| 2017/0060969 A1* | 3/2017 | Dhayapule | G06F 16/254 |

OTHER PUBLICATIONS

List of IBM Patents or Applications Treated as Related.

* cited by examiner

DISTRIBUTED PRODUCT DEPLOYMENT VALIDATION

BACKGROUND

The deployment of a complex cloud based application involve the deployment of many components or artifacts. The application associates artifacts with agents that manage them and user-defined processes that deploy them. Although the deployment process may be automated, the volume of the number of environment requirements makes it difficult to validate and time consuming to verify the environment status and the deployment logs. Due to the complexity of a product and its deployment, the deployment tools may not succeed or may appear to succeed but in fact may fail to deploy one or more components or artifacts. It is difficult to identify the deployment or configuration tasks that failed, and often an engineer is required to check all deployed unit logs to gather information on the actual root cause of the failure. Further, existing validation approaches validate the product after complete deployment, and thus failures cannot be determined until then.

SUMMARY

Disclosed herein is a method for validating a deployment of a system in a computing environment, and a computer program product and system as specified in the independent claims. Embodiments of the present invention are given in the dependent claims. Embodiments of the present invention can be freely combined with each other if they are not mutually exclusive.

According to an embodiment of the present invention, in deploying a system in a computing environment, before deployment of the system, a deployment engine performs a pre-deployment validation of the system using pre-determined system requirements. When the pre-deployment validation of the system fails, the deployment of the system is terminated. When the pre-deployment validation of the system succeeds, the deployment engine performs the following for each artifact of the system. Before deployment of a given artifact of the system, a pre-deployment validation of the given artifact is performed using pre-determined artifact properties. When the pre-deployment validation of the given artifact fails, the deployment of the system is terminated. When the pre-deployment validation of the given artifact succeeds, the given artifact is deployed. After the deployment of the given artifact, a post-deployment validation of the given artifact is performed using deployment data for the given artifact. When the post-deployment validation of the given artifact fails, the deployment of the system is terminated.

In one aspect of the present invention, when the post-deployment validation of each artifact of the system succeeds, a post-deployment validation of the system is performed using system deployment data. When the post-deployment validation of the system fails, either a rollback of the deployment of the system to the original or previous running state is performed, or the deployment is terminated.

In another aspect of the present invention, the deployment is of an incremental or delta change. The deployment engine performs the pre-deployment and post-deployment validations of the incremental deployment using system deployment data. When the incremental change post-deployment validation of the system fails, either a rollback of the deployment of the system to the original or previous running state is performed, or the incremental deployment is terminated.

DETAILED DESCRIPTION

Figure 1:
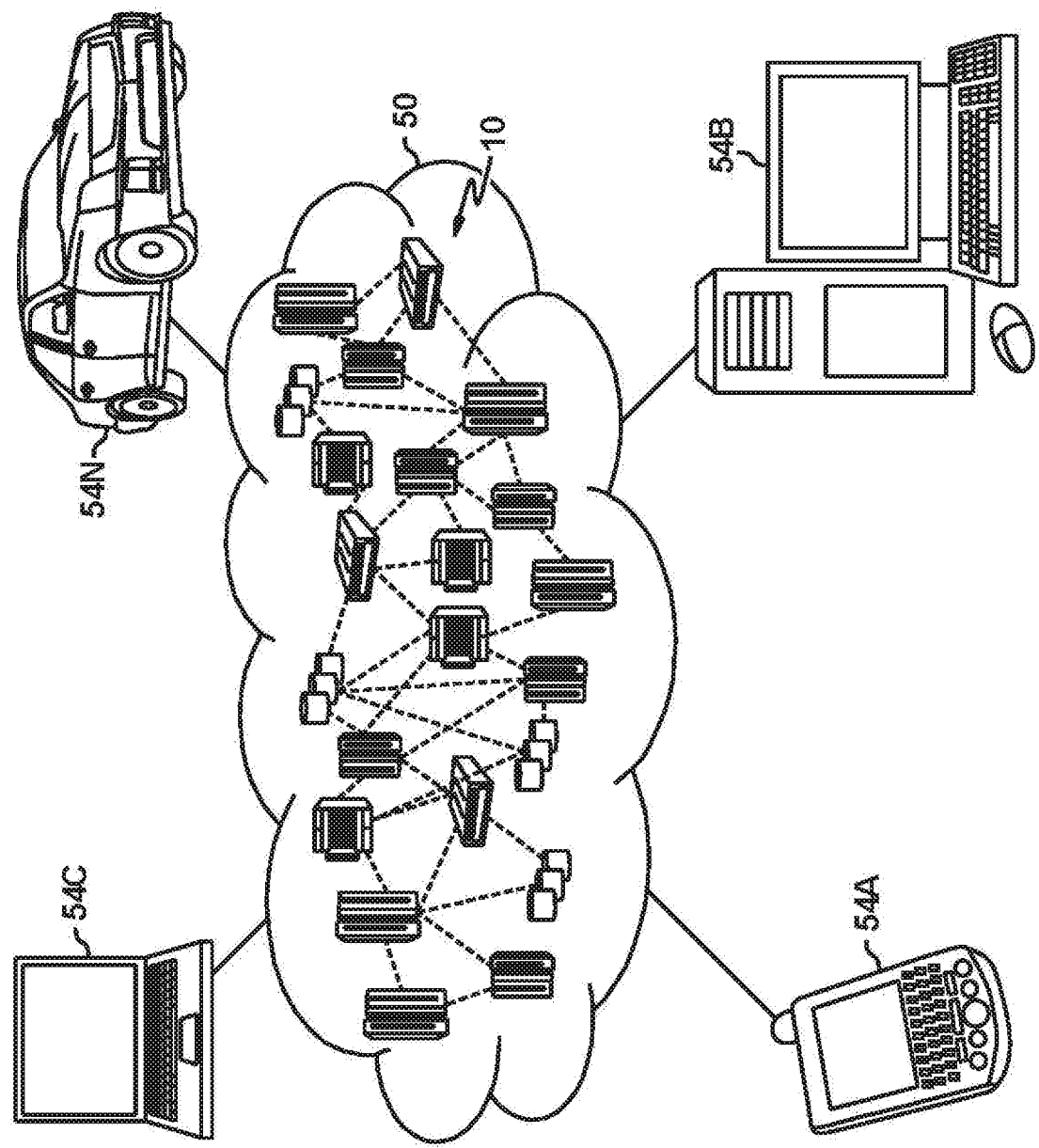
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
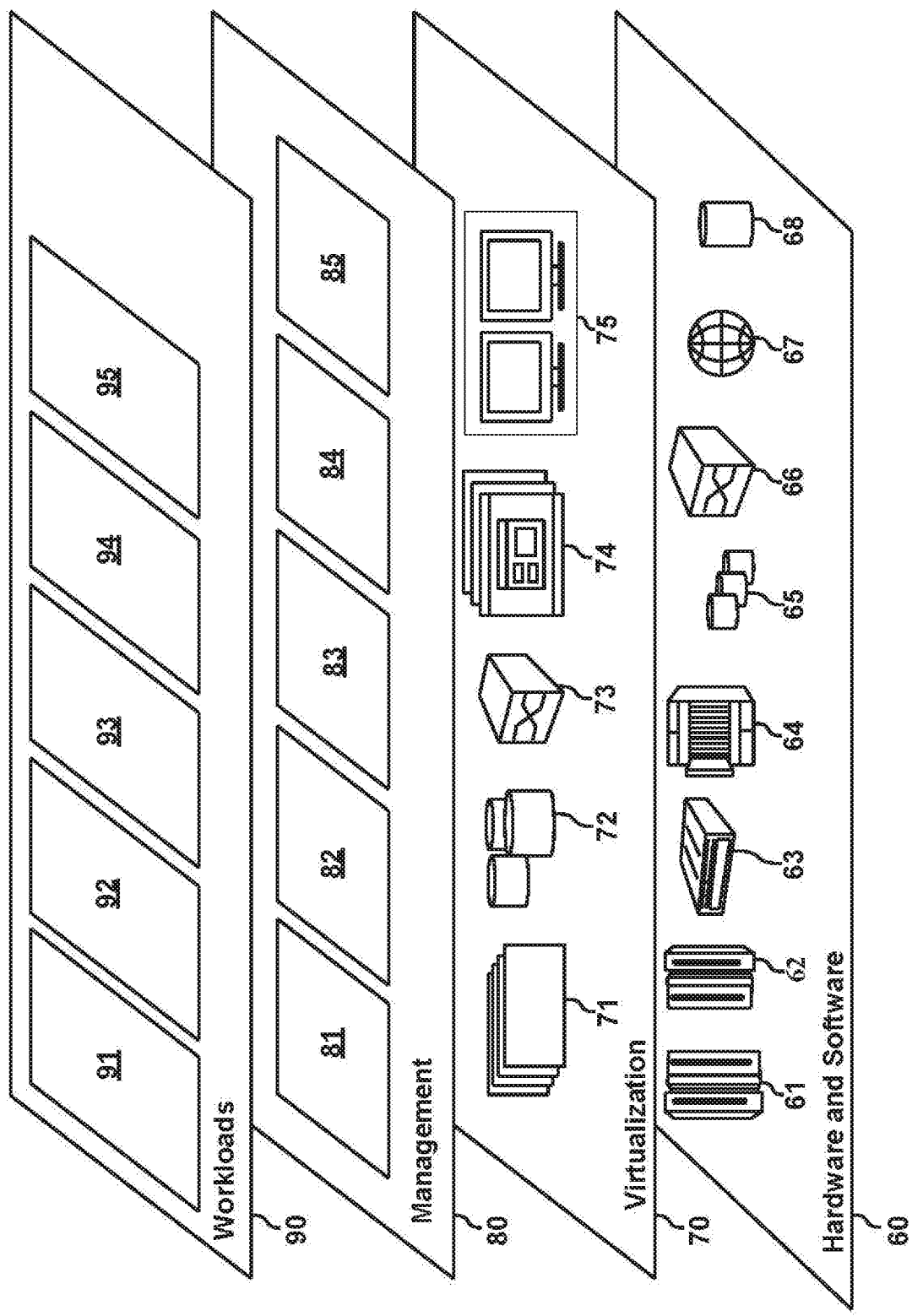
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Embodiments of the present invention include functions corresponding to the hardware and software layer 60, the virtualization layer 70, and the management layer 80.

Embodiments of the present invention create components or artifacts of a system or machine with additional validation capabilities that validates the artifacts and the system before and after deployment. Each artifact is validated before and immediately after deployment. Systems are validated before and after deployment of the artifacts of the system. If errors are found during the validation method, then the error is fixed, if possible. Optionally, after deployment, if errors are found that are not fixable or if the fix is not successful, then a rollback may be performed. After the rollback, the validation method may be repeated. Optionally, incremental updates of artifacts may be deployed, with the validation applied to the updated artifacts and the system before and after deployment of the incremental update. Rollback and subsequent validation of the incremental update may also be applied.

Figure 3:
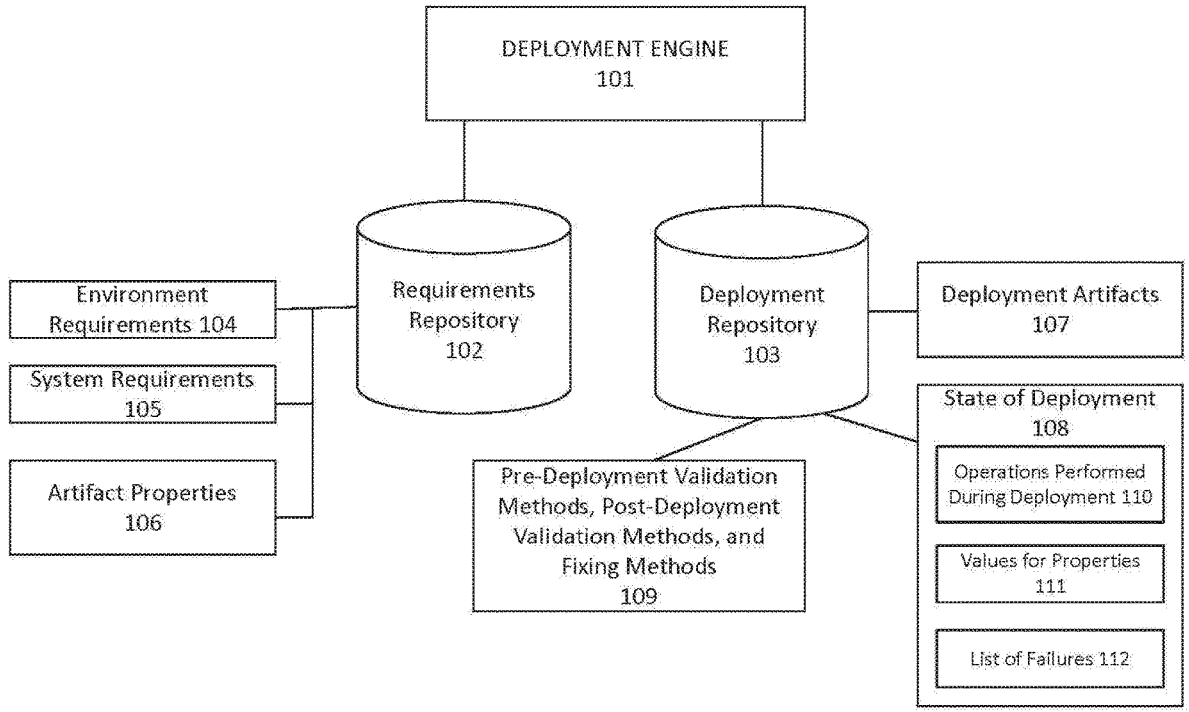
FIG. 3 illustrates a deployment system according to an embodiment of the present invention.

FIG. 3 illustrates a deployment system according to an embodiment of the present invention. The deployment system includes a deployment engine 101 with access to a requirements repository 102 and a deployment repository 103. The deployment engine 101 manages the deployment and validation methods as described herein. The requirements repository 102 stores environment requirements 104, system requirements 105, and artifact properties or requirements 106. Example environment requirements may include cloud platform and infrastructure requirements, and resource requirements as per the environment topology. Example system requirements may include security requirements, repository access requirements, network requirements, and other system hardware requirements. Artifacts may include files, images, databases, configuration materials, or anything else that is associated with a software project. Example artifact requirements may include properties or parameters for the configuration and deployment of the artifact. The deployment repository 103 stores the deployment artifacts 107, the state of deployment 108, and the pre-deployment validation and post-deployment validation methods associated with each artifact, and fixing methods associated with certain error types 109. The state of deployment 108 includes the operations performed during deployment of a system or artifact 110, values of properties during deployment 111, and one or more lists of failures 112 found during the pre-deployment and post-deployment validation methods.

Figure 4:
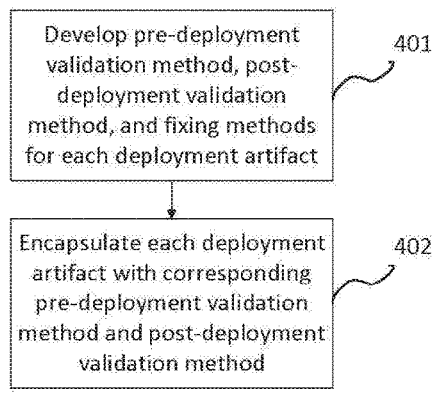
FIG. 4 illustrates a pre-deployment method according to an embodiment of the present invention.

FIG. 4 illustrates a pre-deployment method according to an embodiment of the present invention. Before the deployment of a system and its artifacts, the configuration of the system and each artifact are defined. The requirements for the environment, system, and artifacts, including their properties and values, are stored in the requirements repository 102. The pre-deployment validation method, the post-deployment validation method, and the fixing methods 109 are developed and stored in deployment repository 103 (401). Each artifact is then associated, or "encapsulated", with its corresponding pre-deployment and post-deployment validation methods (402).

Figure 5:
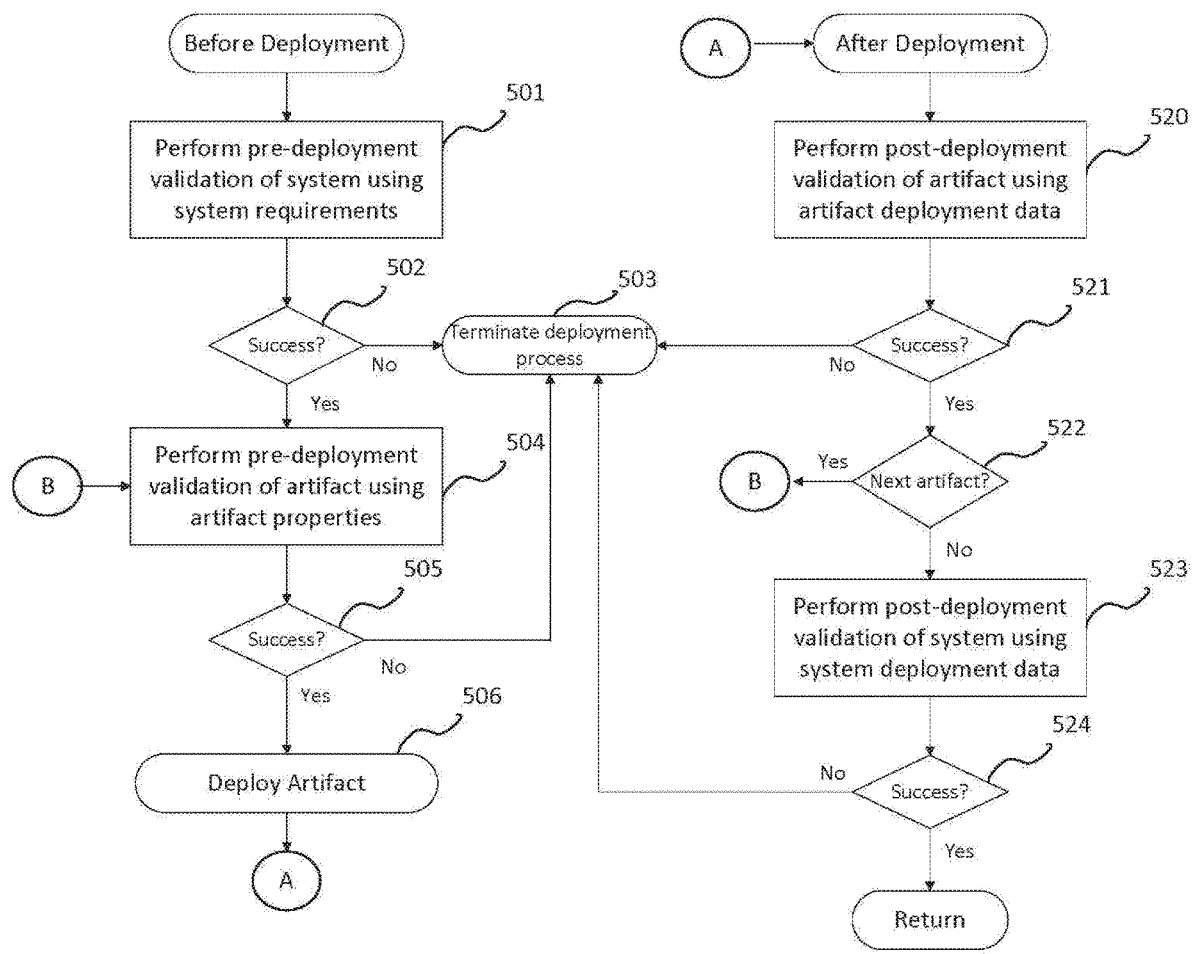
FIG. 5 illustrates a method for deploying a system in an environment according to an embodiment of the present invention.

FIG. 5 illustrates a method for deploying a system in an environment according to an embodiment of the present invention. Before the actual deployment of a system and its artifacts, the deployment engine 101 performs pre-deployment validation of the system using the system requirements stored in the requirements repository 102 (501), as described herein with reference to FIG. 6. If the pre-deployment validation of the system is successful (502), then the deployment engine 101 continues to deploy the artifacts of the system. Otherwise, the deployment engine 101 terminates the deployment process (503). In deploying an artifact of the system, the deployment engine 101 performs pre-deployment validation of the artifact using the artifact properties stored in the requirements repository 102 (504), described herein with reference to FIG. 6. If the pre-deployment validation of the artifact is successful (505), then the deployment engine 101 deploys the artifact (506). Otherwise, the deployment engine 101 terminates the deployment process (503). All operations performed during the pre-deployment method and the state of all requirements and properties after deployment are stored as part of the values for properties 111 in the deployment repository 103.

Figure 7:
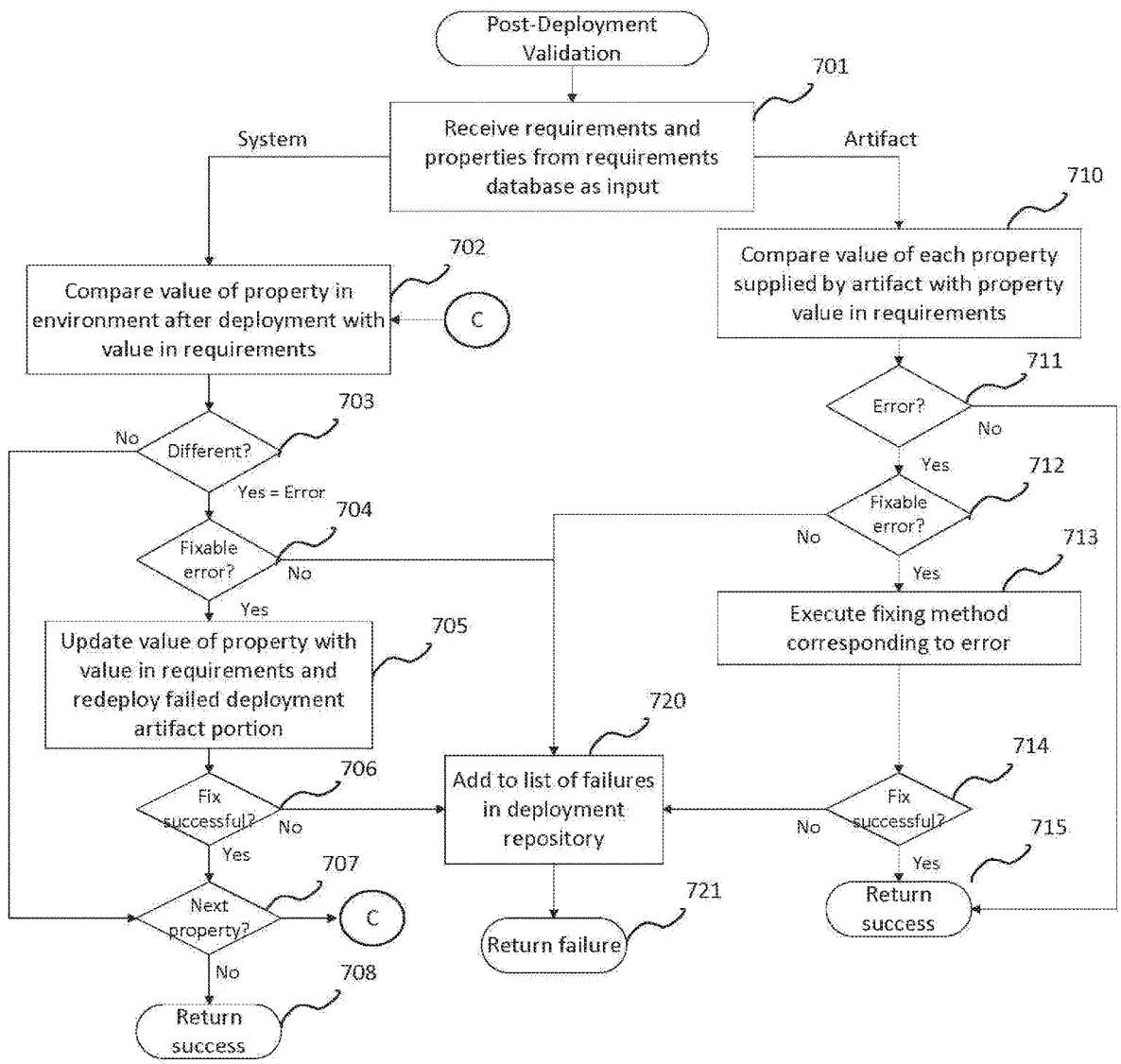
FIG. 7 illustrates a post-deployment validation method according to an embodiment of the present invention.

Immediately after the deployment of the artifact, the deployment engine 101 performs post-deployment validation of the artifact using the state of deployment 108 stored in the deployment repository 103 (520), described herein with reference to FIG. 7. If the post-deployment validation is not successful (521), then the deployment engine 101 terminates the deployment process (503). Otherwise, the deployment engine 101 continues with the deployment of the next artifact, and steps 504-506 are repeated. The above method may be repeated until the post-deployment validation of each artifact of the system is successful, upon which, the deployment engine 101 performs the post-deployment validation of the system, described herein with reference to FIG. 7, using the state of deployment 108 in the deployment repository 103 (523). If the post-deployment validation of the system is not successful (524), then the deployment engine 101 terminates the deployment process (503). Otherwise, the deployment of the system and its components are fully validated. All operations performed during the post-deployment method and the state of all requirements and properties are stored in the deployment repository 103 as part of the state of deployment 108. The method illustrated in FIG. 5 can be repeated for each system in an environment.

Figure 6:
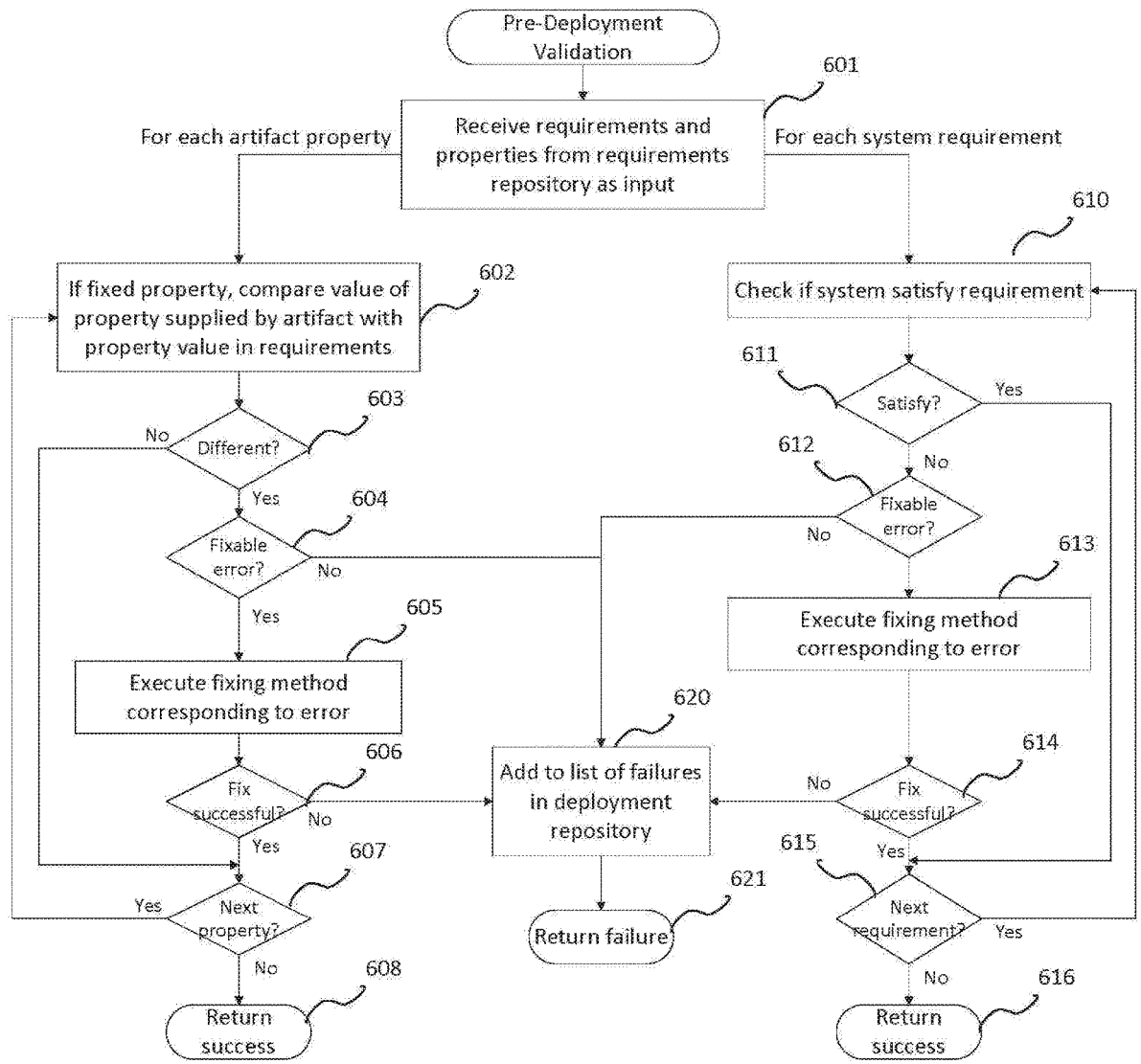
FIG. 6 illustrates a pre-deployment validation method according to an embodiment of the present invention.

FIG. 6 illustrates a pre-deployment validation method according to an embodiment of the present invention. The pre-deployment validation method is performed in two aspects: validation of input specified in a deployment manifest containing properties and their values; and validation of the system. The requirements repository 102 stores the requirements for each environment, each system or host machine, and the deployment manifest. Some of the requirement values can be overwritten and some are constant (fixed). The requirements repository 102 also stores the fixing methods for error types that are fixable. In performing the pre-validation method, the pre-validation method receives the requirements and properties from the requirements repository 102 as input (601). For each property that is a fixed property, the deployment engine 101 compares the value of the property supplied by the artifact with the property value in the requirements (602).

Some of the properties are constant or fixed. Some fixed properties are fixable while others are not. For example, consider a monitoring tag property that is fixable. Assume that the value for the monitoring tag for a production environment from the requirements repository 102 is "Gen5_Production_USA". Assume however that the property value supplied by the deployment is a different value, such as "Gen5_SVT_USA". In this example, the fixing method corresponding to this error discards the "Gen5_SVT_USA" value and fixes the value of this property to "Gen5_Production_USA". Now consider another fixed server property, where the value for this property in the requirements repository 102 is an IP address of "10.89.abc.xyz". Assume, however, that the property value supplied by the deployment is "10.678.xyz.1". During the pre-deployment validation, it is thus found that the supplied IP address of "10.678.xyz.1" is not working. In such a case, the pre-deployment validation method does not consider the value from the requirements repository 102 of "10.89.abc.xyz" and does not fix the server property. Instead, the deployment process terminates. If the IP address supplied by the deployment is functioning properly, then the deployment engine 101 will proceed with the deployment, and the requirements repository 102 will be updated with this new value for the IP address. Now consider some properties that are not fixed or variable, such as a load balancer requirement property. For such properties, the value of the property supplied by the deployment will be considered the final value. Properties that are not fixed may need to be built dynamically based on the set of input property values at runtime, which are validated before the deployment during the pre-deployment validation process. For example, when a version number of an artifact to be deployed is not a fixed property, the version number is compared against the target artifact repository at runtime to validate whether the specified version number exists. This pre-deployment validation of this property allows the termination of the deployment without requiring the invocation of the actual artifact deployment.

If the values are different (603), then the deployment engine 101 determines whether it is a fixable error (604), i.e., whether there is a fixing method available for the error associated with the property. If the error is fixable, then the deployment engine 101 executes the fixing method corresponding to the error type (605). If the error is not fixable (604), or if the fix of the error is not successful (606), then the error is added to the list of failures 112 stored in the deployment repository 103 (620), and 'failure' is returned as the result of the pre-deployment validation (621). Steps 602-606 are repeated for each artifact property (607). If each artifact property is validated successfully, then 'success' is returned as the result of the pre-deployment validation (608).

For each system requirement, the deployment engine 101 checks if the system satisfies the requirement (610). If the system does not satisfy the requirement (611), then the deployment engine 101 determines whether the error is fixable (612), i.e., whether there is a fixing method available for the error associated with the requirement. If the error is fixable, then the deployment engine 101 executes the fixing method corresponding to the error (613). If the error is not fixable (612), or if the fix of the error is not successful (614), then the error is added to the list of failures 112 stored in the deployment repository 103 (620), and 'failure' is returned as the result of the pre-deployment validation (621). Steps 610-614 are repeated for each system requirement (615). If each system requirement is validated successfully, then 'success' is returned as the result of the pre-deployment validation (616).

FIG. 7 illustrates a post-deployment validation method according to an embodiment of the present invention. The post-deployment validation method is performed in two aspects: validation of input specified in the deployment manifest as properly updated in the environment after deployment; and validation of the system. In performing the post-validation method, the deployment engine 101 obtains the requirements and properties from the requirements repository 102 (701). For each system, the deployment engine 101 compares the value of a property in the environment after deployment with the value in the requirements (702). If a value is not specified for the property, then the value is read from the requirements repository 102. If the values are different, then the deployment engine 101 determines whether the error associated with the property is fixable (704). If the error is fixable, then the value is updated with the value in the requirements (705) and the failed deployment artifact portion is redeployed. For example, assume that a configuration file sets a system or environment level configuration property to a value "YP" for a "Production" environment topology. If this property is erroneously set to "YS1", it will affect the way downstream artifacts are deployed, and this issue may not be detected until sometime after deployment. In this example, the failed deployment artifact portion is the "configuration file", which needs to be fixed at the source and redeployed (copied) to the environment. This is because if the property is fixed directly on the environment, then the next redeployment of the artifact will again copy the wrong value of this property to the environment.

If the error is not fixable, or if there is a problem in updating the value, then the error is added to the list of failures 112 stored in the deployment repository 103 (720), and the deployment engine 101 returns 'failure' as the result of the post-deployment validation (721). If the fix of the error is successful (706), then the deployment engine 101 repeats steps 702-706 for the next property (707). If each property of the system is validated successfully, then the deployment engine 101 returns 'success' as the result of the post-deployment validation (708).

For each deployed artifact, the deployment engine 101 checks if the artifact was deployed properly by comparing the value of each property supplied by the artifact with the property value in the requirements (710). If an error is found (711), then the deployment engine 101 determines whether the error is fixable (712), i.e., whether a fixing method is available for the error associated with the property. If the error is fixable, then the deployment engine 101 executes the fixing method corresponding to the error (713). The deployment engine 101 then determines whether the fix of the error is successful (714). If the error is not fixable (712), or if the fix of the error is not successful (714), then the error is added to a list of failures 112 stored in the deployment repository 103 (720), and 'failure' is returned as the result of the post-deployment validation (721). Otherwise, 'success' is returned as the result of the post-deployment validation (715).

Figure 8:
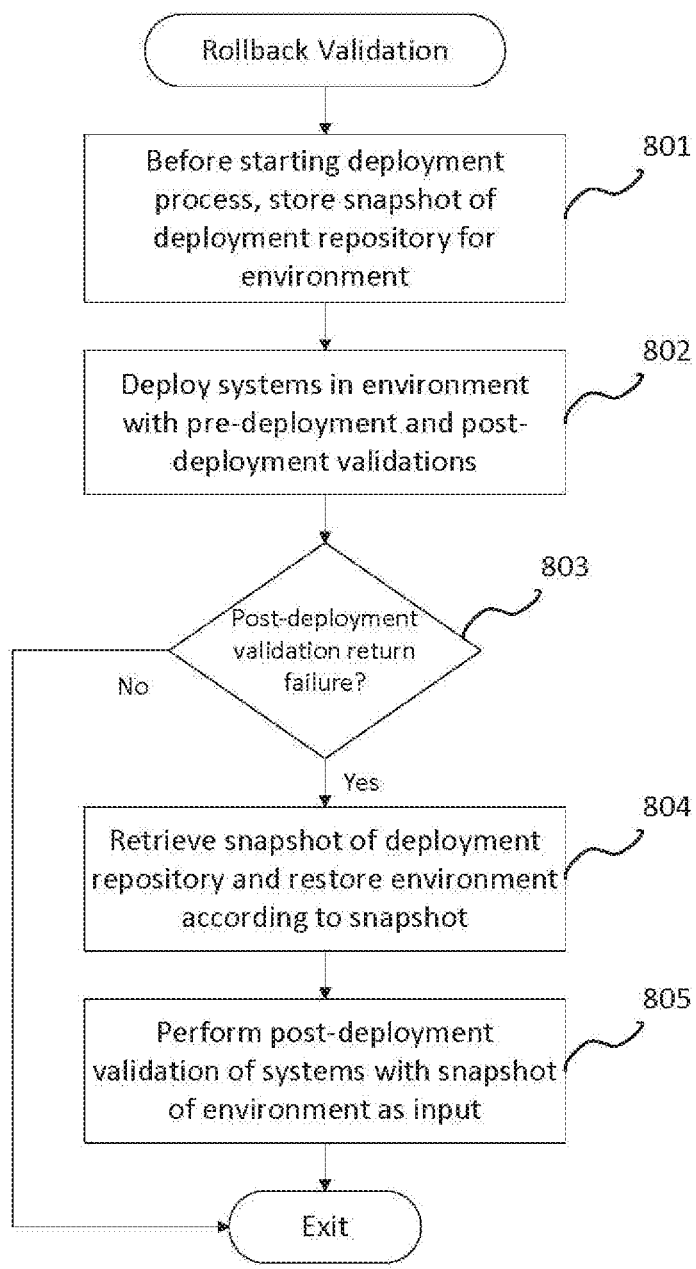
FIG. 8 illustrates a rollback validation method according to an embodiment of the present invention.

Optionally, if the post-deployment validation of the system fails, a deployment rollback may be performed. FIG. 8 illustrates a rollback validation method according to an embodiment of the present invention. In order to perform a rollback, before starting the deployment method, the deployment engine 101 stores a snapshot of the deployment repository 103 for the environment. The deployment engine 101 then performs the deployment of the systems in the environment with the pre-deployment and post-deployment validations described above (802). If the post-deployment validation method of a system in the environment returns a 'failure' (803), then the deployment engine 101 retrieves the snapshot of the deployment repository 103 for the environment and restores the environment according to the snapshot (804). The deployment engine 101 then performs the post-deployment validation of the system again, as described above, with the snapshot of the environment as input (805).

Figure 9:
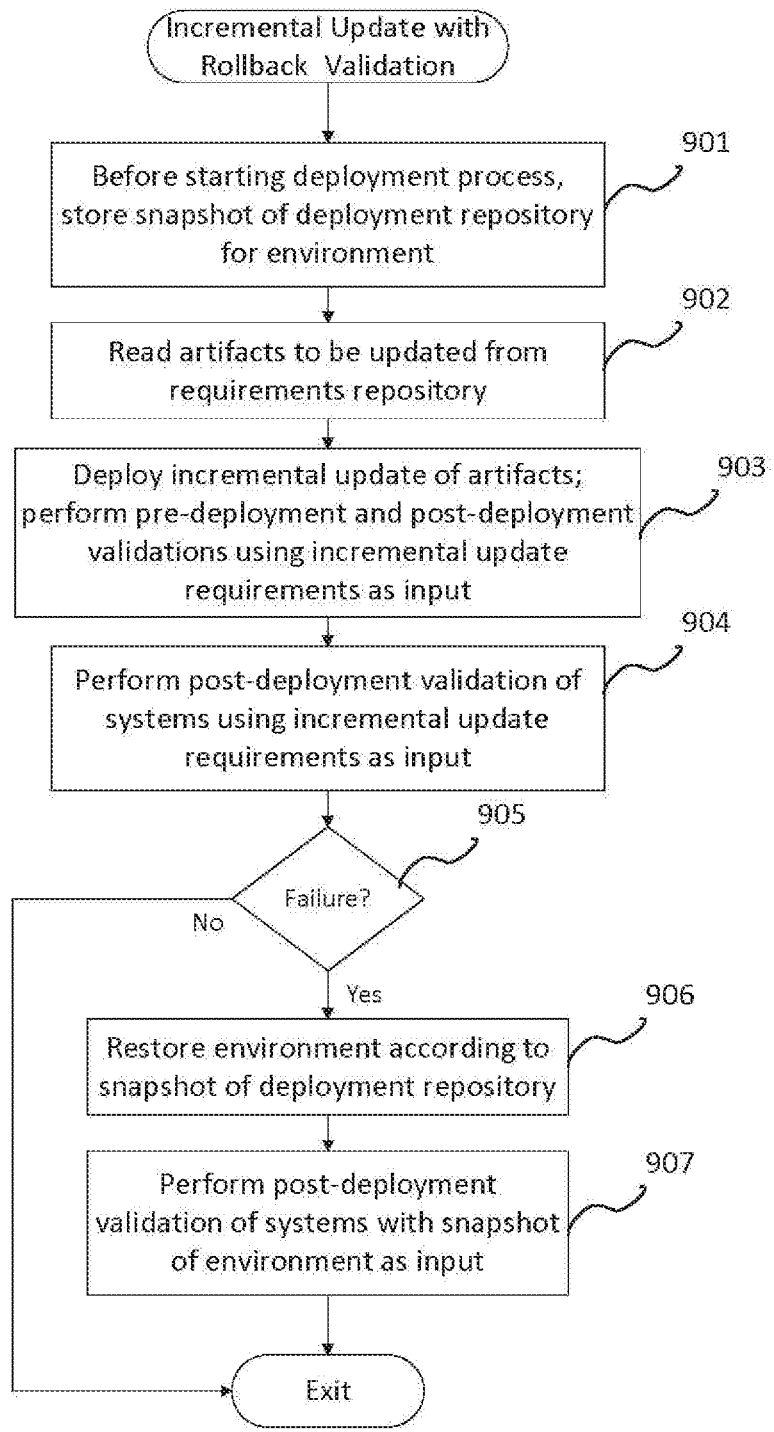
FIG. 9 illustrates an incremental deployment method with rollback validation according to an embodiment of the present invention.

Optionally, an incremental update of artifacts can be performed when only one or a few artifacts, instead of the complete environment, need to be deployed. Embodiments of the present invention may also be used to validate such incremental updates. Deployment rollback may optionally be applied to the incremental updates. FIG. 9 illustrates an incremental deployment method with rollback validation according to an embodiment of the present invention. When deployment rollback is enabled, before starting the deployment method, the deployment engine 101 stores a snapshot of the deployment repository 103 for the environment (901). The deployment engine 101 reads the artifacts to be updated from the requirements repository 102 (902). The deployment engine 101 deploys the incremental update of artifacts, including performing the pre-deployment and post-deployment validations of the system and artifacts to be updated as described above, using the incremental update requirements as input (903). If the pre-deployment validation of the update fails, then the deployment of the update is terminated. If the pre-deployment validation succeeds, then the updated artifact is deployed. After deploying the updated artifact, the post-deployment validation of the update is performing using deployment data for the updated artifact. If the post-deployment validation of the updated artifact fails, then the deployment of the updated artifact is terminated, and a deployment rollback may be performed if enabled. If the post-deployment of the updated artifact is successfully validated, the deployment engine 101 then perform the post-deployment validation of the system using the incremental update requirements as input (904). If the post-deployment validation method returns 'failure' (905), and deployment rollback is enabled, then the deployment engine 101 performs incremental deployment rollback by restoring the environment according to the snapshot of the deployment repository 103 for the environment (906). After the incremental deployment rollback is completed, the deployment engine 101 performs the post-deployment validation method of the systems again with the snapshot of the environment as input (907).

Figure 10:
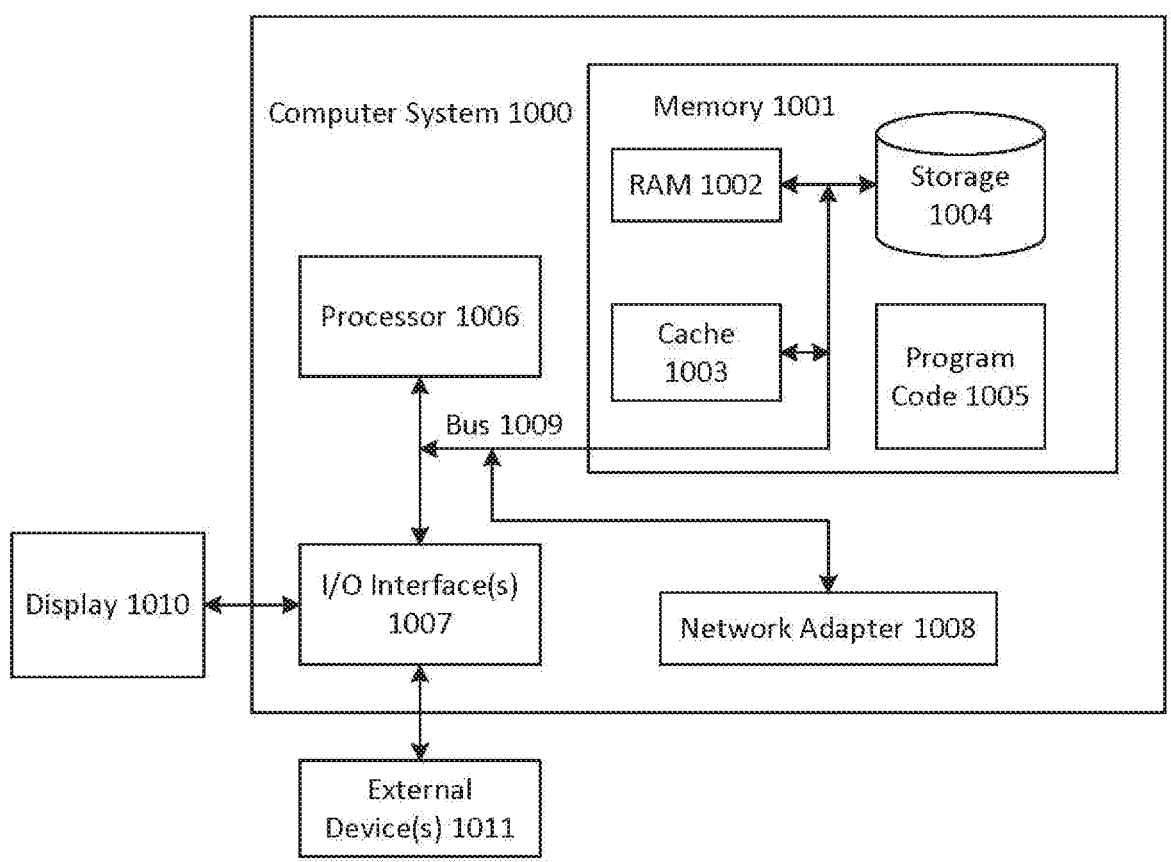
FIG. 10 illustrates a computer system according to embodiments of the present invention.

FIG. 10 illustrates a computer system according to embodiments of the present invention. The computer system 1000 is operationally coupled to a processor or processing units 1006, a memory 1001, and a bus 1009 that couples various system components, including the memory 1001 to the processor 1006. The bus 1009 represents one or more of any of several types of bus structure, including a memory bus or memory controller, a peripheral bus, an accelerated graphics port, and a processor or local bus using any of a variety of bus architectures. The memory 1001 may include computer readable media in the form of volatile memory, such as random access memory (RAM) 1002 or cache memory 1003, or non-volatile storage media 1004. The memory 1001 may include at least one program product having a set of at least one program code module 1005 that are configured to carry out the functions of embodiment of the present invention when executed by the processor 1006. The computer system 1000 may also communicate with one or more external devices 1011, such as a display 1010, via I/O interfaces 1007. The computer system 1000 may communicate with one or more networks via network adapter 1008.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for validating a deployment of a system in a computing environment, the system comprising a plurality of components, the computer program product comprising a computer readable storage medium having program instructions embodied therewith, the program instructions executable by one or more processors cause the one or more processors to:
    before deployment of the system, perform a pre-deployment validation of the system using pre-determined system requirements;
    when the pre-deployment validation of the system fails, terminate the deployment of the system;
    when the pre-deployment validation of the system succeeds, perform a pre-deployment validation and a post-deployment validation for a given component of the plurality of components of the system, comprising:
        before deployment of the given component, perform the pre-deployment validation of the given component using pre-determined properties for the given component;
        when the pre-deployment validation of the given component fails, terminate the deployment of the system;
        when the pre-deployment validation of the given component succeeds, deploy the given component;
        immediately after the deployment of the given component, perform a post-deployment validation of the given component using deployment data for the given component;
        when the post-deployment validation of the given component fails, terminate the deployment of the system; and
        when the post-deployment validation of the given component succeeds, repeat the performance of the pre-deployment validation, and the post-deployment validation for a next given component of the plurality of components of the system; and
    when the pre-deployment validation and the post-deployment validation of each of the plurality of components succeeds, perform a post-deployment validation of the system using values of one or more properties in the computing environment.

2. The computer program product of claim 1, wherein the one or more processors are further caused to:
    when the post-deployment validation of the system fails, terminate the deployment of the system.

3. The computer program product of claim 1, wherein for each of the pre-determined system requirements, the pre-deployment validation of the system comprises:
    determine whether the system satisfies a given predetermined system requirement;
    when the system does not satisfy the given predetermined system requirement, determine whether a fixing method corresponding to an error associated with the given predetermined system requirement is available;
    when the fixing method corresponding to the error is not available, return a failure for the pre-deployment validation of the system;
    when the fixing method corresponding to the error is available, execute the fixing, method; and
    when the system either satisfies or fixes errors for each of the given predetermined system requirements, return a success for the pre-deployment validation of the system.

4. The computer program product of claim 1, wherein for each of the pre-determined properties for the given component, the pre-deployment validation of the given component comprises:
    compare a value of a given property supplied by the given component with a value in the pre-determined properties for the given component;
    when the value of the given property is different from the value in the pre-determined properties, determine whether a fixing method corresponding to an error associated with the given property is available;

when the fixing method corresponding to the error associated with the given property is not available, return a failure for the pre-deployment validation of the given component;

when the fixing method corresponding to the error is available, execute the fixing method; and when the given component either satisfies or fixes errors for each of the given pre-determined properties for the given component, return a success for the pre-deployment validation of the given component.

5. The computer program product of claim 1, wherein for each of the pre-determined properties for the given component, the post-deployment validation of the given component comprises:

compare a value of a given property supplied by the given component with a value in the pre-determined properties for the given component;

when the value of the given property is different from the value in the pre-determined properties, determine whether a fixing method corresponding to an error associated with the given property is available;

when the fixing method corresponding to the error associated with the given property is not available, return a failure for the post-deployment validation of the given component;

when the fixing method corresponding to the error is available, execute the fixing method; and when the given component either satisfies or fixes errors for each of the given pre-determined properties for the given component, return a success for the post-deployment validation of the given component.

6. The computer program product of claim 1, wherein the one or more processors are further caused to:

when the post-deployment validation, of the system fails, perform a deployment rollback, comprising:

retrieve a snapshot of a deployment repository for the computing environment captured prior to the deployment of the system;

restore the computing environment according to the snapshot; and perform the post-deployment validation of the system using the snapshot of the deployment, repository.

7. The computer program product of claim 1, wherein the one or more processors are further caused to:

determine that one or more incremental updates for one or more of the plurality of components are to be deployed in the system;

perform a pre-deployment validation and a post-deployment validation for the one or more incremental updates for the one or more of the plurality of components, comprising:

before deployment of a given incremental update for the given component, perform the pre-deployment validation of the given component using incremental update requirements for the given incremental update;

when the pre-deployment validation of the given component fails, terminate the deployment of the one or more incremental updates;

when the pre-deployment validation of the given component succeeds, update the given component according to the given incremental update and deploy the updated given component;

immediately after the deployment of the updated given component, perform the post-validation of the updated given component using deployment data for the updated given component; and when the post-deployment validation of the updated given component fails, terminate the deployment of the one or more incremental updates.

8. The computer program product of claim 7, wherein the one or more processors are further caused to:

when the post-deployment validation of the updated given component fails, further perform an incremental deployment rollback, comprising:

retrieve a snapshot of a deployment repository for the computing environment captured prior to the deployment of the given incremental update;

restore the computing environment according to the snapshot; and perform the post-deployment validation of the system using the snapshot of the deployment repository.

9. A system, comprising:

a computer readable storage medium having program instructions embodied therewith for validating a deployment of a computing system in a computing environment, the computing system comprising a plurality of components, the program instructions executable by one or more processors cause the one or more processors to:

before deployment of the computing system, perform a pre-deployment validation of the computing system using pre-determined system requirements;

when the pre-deployment validation of the computing system fails, terminate the deployment of the computing system;

when the pre-deployment validation of the computing system succeeds, perform a pre deployment validation and a post-deployment validation for a given component of the plurality of components of the computing system, comprising:

before deployment of the given component, perform the pre-deployment validation of the given component using pre-determined properties for the given component;

when the pre-deployment validation of the given component fails, terminate the deployment of the computing system;

when the pre-deployment validation of the given component succeeds, deploy the given component;

immediately after the deployment of the given component, perform a post-deployment validation of the given component using deployment data for the given component;

when the post-deployment validation of the given component fails, terminate the deployment of the computing system; and when the post-deployment validation of the given component succeeds, repeat the performance of the pre-deployment validation and the post-deployment validation for a next given component of the plurality of components of the system; and when the pre-deployment validation and the post-deployment validation of each of the plurality of components succeeds, perform a post-deployment validation of the system using values of one or more properties in the computing environment.

10. The system of claim 9, wherein the one or more processors are further caused to:

when the post-deployment validation of the computing system fails, terminate the deployment of the computing system.

11. The system of claim 9, wherein for each of the pre-determined system requirements, the pre-deployment validation of the computing system comprises:
  determine whether the computing system satisfies a given predetermined system requirement;
  when the system does not satisfy the given predetermined system requirement, determine whether a fixing method corresponding to an error associated with the given predetermined system requirement is available;
  when the fixing method corresponding to the error is not available, return a failure for the pre-deployment validation of the computing system;
  when the fixing method corresponding to the error is available, execute the fixing method; and
  when the computing system either satisfies or fixes errors for each of the given predetermined system requirements, return a success for the pre-deployment validation of the computing system.

12. The system of claim 9, wherein for each of the pre-determined properties for the given component, the pre-deployment validation of the given component comprises:
  compare a value of a given property supplied by the given component with a value in the pre-determined properties for the given component;
  when the value of the given property is different from the value in the pre-determined properties, determine whether a fixing method corresponding to an error associated with the given property is available;
  when the fixing method corresponding to the error associated with the given property is not available, return a failure for the pre-deployment validation of the given component;
  when the fixing method corresponding to the error is available, execute the fixing method; and
  when the given component either satisfies or fixes errors for each of the given pre-determined properties for the given component, return a success for the pre-deployment validation of the given component.

13. The system of claim 9, wherein for each of the pre-determined properties for the given component, the post-deployment validation of the given component comprises:
  compare a value of a given property supplied by the given component with a value in the pre-determined properties for the given component;
  when the value of the given property is different from the value in the pre-determined properties, determine whether a fixing method corresponding to an error associated with the given property is available;
  when the fixing method corresponding to the error associated with the given property is not available, return a failure for the post-deployment validation of the given component;
  when the fixing method corresponding to the error is available, execute the fixing method; and
  when the given component either satisfies or fixes errors for each of the given pre-determined properties for the given component, return a success for the post-deployment validation of the given component.

14. The system of claim 9, wherein the one or more processors are further caused to:
  when the post-deployment validation of the system fails, perform a deployment rollback, comprising:
    retrieve a snapshot of a deployment repository for the computing environment captured prior to the deployment of the system;
    restore the computing environment according to the snapshot; and
    perform the post-deployment validation of the system using the snapshot of the deployment repository.

15. The system of claim 9, wherein the one or more processors are further caused to:
  determine that one or more incremental updates for one or more of the plurality of components are to be deployed in the system;
  perform a pre-deployment validation and a post-deployment validation for the one or more incremental updates for the one or more of the plurality of components, comprising:
    before deployment of a given incremental update for the given component, perform the pre-deployment validation of the given component using incremental update requirements for the given incremental update;
    when the pre-deployment validation of the given component fails, terminate the deployment of the one or more incremental updates;
    when the pre-deployment validation of the given component succeeds, update the given component according to the given incremental update and deploy the updated given component;
    immediately after the deployment of the updated given component, perform the post-validation of the updated given component using deployment data for the updated given component; and
    when the post-deployment validation of the updated given component fails, terminate the deployment of the one or more incremental updates.

16. The system of claim 15, wherein the one or more processors are further caused to:
  when the post-deployment validation of the updated given component fails, further perform an incremental deployment rollback, comprising:
    retrieve a snapshot of a deployment repository for the computing environment captured prior to the deployment of the given incremental update;
    restore the computing environment according to the snapshot; and
    perform the post-deployment validation of the system using the snapshot of the deployment repository.

* * * * *

UNITED STATES PATENT AND TRADEMARK OFFICE
CERTIFICATE OF CORRECTION

PATENT NO. : 10,649,834 B2
APPLICATION NO. : 15/820291
DATED : May 12, 2020
INVENTOR(S) : Raghavendra Rao Dhayapule et al.

Page 1 of 1

It is certified that error appears in the above-identified patent and that said Letters Patent is hereby corrected as shown below:

On the Title Page

Item (73), add: International Business Machines Corporation, Armonk, NY (Corporation)

Signed and Sealed this
Thirtieth Day of June, 2020

Andrei Iancu
*Director of the United States Patent and Trademark Office*